US010088349B2

United States Patent
Lötters et al.

(10) Patent No.: US 10,088,349 B2
(45) Date of Patent: Oct. 2, 2018

(54) CORIOLIS FLOWSENSOR WITH ACTIVE VIBRATION DAMPING

(71) Applicant: BERKIN B.V., Ruurlo (NL)

(72) Inventors: Joost Conrad Lötters, Ruurlo (NL); Marcel Ronald Katerberg, Ruurlo (NL); Wouter Bernardus Johannes Hakvoort, Ruurlo (NL); Willem David Kruijswijk, Ruurlo (NL); Lubbert Van De Ridder, Ruurlo (NL)

(73) Assignee: BERKIN B.V., Ruurlo, AK (NL)

( * ) Notice: Subject to any disclaimer, the term of this patent is extended or adjusted under 35 U.S.C. 154(b) by 190 days.

(21) Appl. No.: 15/038,981

(22) PCT Filed: Nov. 25, 2014

(86) PCT No.: PCT/NL2014/050799
§ 371 (c)(1),
(2) Date: May 24, 2016

(87) PCT Pub. No.: WO2015/076676
PCT Pub. Date: May 28, 2015

(65) Prior Publication Data
US 2016/0363472 A1    Dec. 15, 2016

(30) Foreign Application Priority Data

Nov. 25, 2013 (NL) ...................................... 2011836
Mar. 24, 2014 (NL) ...................................... 2012498

(51) Int. Cl.
*G01F 15/14*    (2006.01)
*G01F 1/84*    (2006.01)
*F16F 15/02*    (2006.01)

(52) U.S. Cl.
CPC ............ *G01F 1/8427* (2013.01); *F16F 15/02* (2013.01); *G01F 1/844* (2013.01); *G01F 1/8418* (2013.01); *G01F 1/8481* (2013.01); *G01F 15/14* (2013.01)

(58) Field of Classification Search
CPC ...... G01F 1/8413; G01F 1/8418; F16F 15/02; F16F 15/03
See application file for complete search history.

(56) References Cited

U.S. PATENT DOCUMENTS

| 7,340,965 B2* | 3/2008 | Mehendale | G01F 1/8409 73/861.355 |
| 7,571,793 B2* | 8/2009 | Warmerdam | B60G 17/0157 188/378 |

(Continued)

FOREIGN PATENT DOCUMENTS

| DE | 102010030340 | 1/2011 |
| EP | 1719982 | 11/2006 |

(Continued)

*Primary Examiner* — Justin Olamit
(74) *Attorney, Agent, or Firm* — Casimir Jones S.C.; Tyler J. Sisk (57) ABSTRACT

The invention relates to a Coriolis flow sensor. The sensor comprises a housing and at least a Coriolis-tube with at least two ends being fixed in a tube fixation means. The flow sensor comprises excitation means for causing the tube to oscillate, as well as detection means for detecting at least a measure of displacements of parts of the tube during operation. According to the invention, the Coriolis flow sensor comprises a reference mass, as well as further excitation means arranged for causing the reference mass to oscillate during operation, as well as further detection means for detecting at least a measure of displacements of the reference mass during operation. Additionally, control means are provided for controlling the excitation means and/or further excitation means based on vibrations measured by the (Continued)

detection means and/or further detection means. This way a Coriolis flow sensor with active vibration isolation is obtained.

24 Claims, 9 Drawing Sheets

(56) References Cited

U.S. PATENT DOCUMENTS

| | | | | |
|---|---|---|---|---|
| 8,561,479 | B2* | 10/2013 | Hagedoorn | G01F 1/8409 |
| | | | | 73/861.355 |
| 8,931,354 | B2* | 1/2015 | Ricken | G01F 1/8409 |
| | | | | 73/861.355 |
| 9,250,109 | B2* | 2/2016 | Luo | G01F 1/8418 |
| 2008/0237947 | A1 | 10/2008 | Warmerdam et al. | |
| 2010/0030384 | A1* | 2/2010 | Kraner | F16F 15/02 |
| | | | | 700/280 |
| 2013/0042701 | A1* | 2/2013 | Hussain | G01F 1/8413 |
| | | | | 73/861.355 |

FOREIGN PATENT DOCUMENTS

| | | |
|---|---|---|
| EP | 2199756 | 6/2010 |
| EP | 2261530 | 12/2010 |
| JP | H08122120 | 5/1996 |
| WO | 99/40394 | 8/1999 |

* cited by examiner

CORIOLIS FLOWSENSOR WITH ACTIVE VIBRATION DAMPING

The invention relates to a Coriolis flow sensor, comprising at least a Coriolis-tube with at least two ends being fixed in a tube fixation means, wherein the flow sensor comprises excitation means for causing the tube to oscillate, as well as detection means for detecting at least a measure of displacements of parts of the tube during operation.

A Coriolis flow sensor having a loop-shaped Coriolis tube is known from EP 1 719 982 A1. Various types of loop-shaped Coriolis tubes are described therein, both of the single loop type and of the (continuous) double loop type. The present invention relates to any of these types, but is not restricted thereto.

A Coriolis flow sensor (also indicated as flow sensor of the Coriolis type) comprises at least one vibrating tube, often denoted Coriolis tube, flow tube, or sensing tube. This tube or these tubes is or are fastened at both ends to the housing of the instrument. These tube ends serve at the same time as feed and discharge ducts for the liquid or gas flow to be measured.

Besides the flow tube (or tubes), a Coriolis flow sensor comprises two further subsystems, i.e. one for excitation and one for detection. The excitation system (exciter) is arranged for bringing the tube into vibration. For this purpose, one or several forces or torques are applied to portions of the tube. The detection system is arranged for detecting at least a measure of the displacements of one or several points of the tube as a function of time. Instead of this displacement, the force (or torque) exerted by the tube on its environment may alternatively be measured. The same holds true for the velocity, acceleration and strain of the tube; what will be described below with reference to displacement detection is equally valid for force detection, velocity detection, acceleration detection and/or strain detection.

As a fluid flows in the vibrating tube, it induces Coriolis forces, proportional to the mass-flow, which affect the tube motion and change the mode shape. Measuring the tube displacement using the detection system, the change of the mode shape may be measured, which allows for mass-flow measurements.

The vibration of the tube generated by the exciter takes place at a more or less fixed frequency which varies slightly as a function, amongst others, of the density of the medium flowing through the tube. The vibration frequency is almost always a natural frequency of the tube so that a maximum amplitude can be achieved with a minimum energy input.

Besides the effect of the mass-flow on the mode shape of the tube, external vibrations can introduce motions that cannot be distinguished from the Coriolis force induced motion. The external vibrations create additional components in the Coriolis flow sensor signals, and those additional components can introduce a measurement error. For low flows, the Coriolis force induced motion is relatively small compared to external vibrations induced motions. Coriolis flow sensors designed to be sensitive to low flows, are normally rather sensitive to external vibrations.

To minimize the influence of floor vibration on the measurement value, it is known in the prior art to use so called passive vibration isolation. According to the prior art, passive isolation consist of several stages of mass-spring-damper systems between the floor and the tube fixation means, the parameters are adjusted to achieve high-frequency attenuation, which is appropriate for many applications. The better the vibration isolation system the better the decoupling of the internal measurement system from any environmental disturbances.

It is an object of the present invention to provide an improved Coriolis flow sensor, in particular a Coriolis flow sensor designed to be sensitive to low flows, wherein the influence of external vibrations is reduced.

To this end, the invention provides a Coriolis flow sensor, that is characterized in that it comprises a reference mass, further excitation means arranged for causing the reference mass to oscillate, as well as further detection means. The further detection means are in an embodiment arranged for detecting at least a measure of displacements of the reference mass during operation. With this, it is meant that the further detection means are at least arranged for detecting relative displacements of the reference mass, for instance between the reference mass and the Coriolis tube, or between the reference mass and the housing. In this sense, it is thinkable that the further detection means are arranged for detecting at least a measure of displacements of the housing during operation. A detection of displacements of both the reference mass and the housing is also possible. An absolute displacement detection (of the reference mass and/or the housing) is conceivable as well. Additionally, control means are provided for controlling the excitation means and/or further excitation means based on movements and/or vibrations measured by the detection means and/or further detection means.

The reference mass together with the further excitation means and the further detection means provide in effect active vibration isolation means which are arranged for active vibration isolation, in order to minimize the effect external vibrations have on the Coriolis-tube. This may in general be done by means of two principles, or a combination thereof, which two principles will be elucidated below.

Using the first principle, the Coriolis-tube, the reference mass, and the housing may be connected in series. The reference mass is then connected to the Coriolis-tube, in particular to the tube fixation means. The further excitation means may be used to counter movements of the housing so as to substantially fix the absolute position of the reference mass, or in other words to create a stable ground for the Coriolis-tube, such that vibrations or other disturbances on the housing do not result in vibrations on the Coriolis-tube, and hence do not affect the Coriolis force induced vibrations on the Coriolis-tube.

Using the second principle, the Coriolis-tube and the reference mass are positioned in parallel to each other, each being connected to the housing. The housing is then connected to the Coriolis-tube, in particular to the tube fixation means. The further excitation means and further detection means may be used to match the dynamic properties of the reference mass with the dynamic properties of the Coriolis-tube in response to external vibrations. Thus, disturbances due to external vibrations acting on the housing act on both the reference mass and the Coriolis-tube, in a similar manner. Thereby, the relative displacements of the Coriolis tube are at least substantially insensitive to external vibration, but still sensitive to the Coriolis force. Alternatively, disturbances on the reference mass, that are (directly or indirectly) measured by the further detection means may be used to correct the measurements obtained by the detection means for detecting at least a measure for displacements of the Coriolis-tube.

A combination of the first and second principle is thinkable, which uses the set-up of the first principle with an additional reference mass connected to the reference mass, positioned in parallel to the Coriolis-tube. The first reference mass is used as a stable ground for the Coriolis-tube, and the additional reference mass may be used to filter out any further disturbances that still act on the additional reference mass and the Coriolis tube.

Thus, it is shown that the Coriolis flowsensor according to the present invention is less sensitive to external vibrations, and hence the object of the current invention is achieved.

Advantageous embodiments of the present invention are subject of the dependent claims, and will be elucidated below.

In an embodiment, the reference mass is connected to the housing. This provides for a relatively compact embodiment of the flow sensor, since it allows the components of the active vibration isolation to be positioned within a casing of the flow sensor.

The reference mass may be connected to the housing by means of spring elements, in particular flexures or spring-leafs. This provides for an effective, yet relatively compact and cheap construction.

According to an aspect, active vibration isolation is accomplished by means of a first principle, which substantially fixes the position of the reference mass. The reference mass may comprise the tube fixation means, or at least the tube fixation means are substantially rigidly connected to the reference mass. The control means are arranged for moving the reference mass in opposite directions to movements of the housing, in particular movements due to external vibrations acting on the housing.

The further excitation means are in an embodiment provided between the housing or a part rigidly connected to the housing, on the one hand, and to the reference mass on the other hand.

The further excitation means may comprise a number of excitation members. For instance, a single excitation member, such as a Piezo element and/or Lorentz actuator, may suffice to eliminate some vibrations acting on the housing. In line with this, a single detection member may suffice to detect the displacement of the reference mass.

According to an improved embodiment, the excitation means comprise at least three excitation members. In addition, it is conceivable that the detection means comprise at least three detection members.

The further detection means are in an embodiment arranged for detecting at least a measure for movements of the housing or a part rigidly connected thereto. The control means are in an embodiment arranged for moving the reference mass with respect to the housing based on feedforward control. In an embodiment, the control means are arranged for oscillating the reference mass based on feedforward control. Moving or oscillating preferably counters movements of the housing, in particular due to external vibrations.

The further detection means are in an embodiment arranged for detecting at least a measure for movements of the reference mass. The control means are arranged for moving, for instance oscillating, the reference mass with respect to the housing, based on feedback control.

The further detection means are in an embodiment arranged for detecting at least a measure for movements of the housing, and additional detection means are provided for detecting at least a measure for movements of the reference mass, and wherein the control means are arranged for moving, for instance oscillating, the reference mass with respect to the housing based on both feedback control and feedforward control.

The reference mass may comprise the excitation means for the Coriolis tube.

The reference mass may comprise the detection means for the Coriolis tube.

According to an aspect, active vibration isolation is accomplished by means of a second principle, which substantially matches the dynamic properties of the reference mass to the dynamic properties of the Coriolis tube in response to external vibrations. The housing may comprise the tube fixation means, or at least the tube fixation means is rigidly connected to the housing. The control means are arranged for moving the reference mass substantially identically to the Coriolis tube in response to movements of the housing, in particular movements due to external vibrations acting on the housing. Thereby the relative motion of the Coriolis tube and reference mass is not affected by movements of the housing. The relative motion may be measured directly or reconstructed from the measured motion of the Coriolis tube and reference mass. A feedback control scheme, a feedforward control scheme, or a combination of these may be used.

According to an aspect, active vibration isolation is accomplished by means of the first and second principle described above. In this sense, an additional reference mass is used, in combination with the reference mass.

In an embodiment, the flow sensor comprises an additional reference mass which may be connected to the reference mass, additional excitation means arranged for causing the additional reference mass to oscillate, as well as additional detection means for detecting at least a measure for displacements of the additional reference mass during operation. Additionally, control means are provided for controlling the excitation means and/or further excitation means and/or additional excitation means based on vibrations measured by the detection means and/or further detection means and/or additional detection means.

The detection means (or further detection means, or additional detection means) may be arranged for detecting at least a measure for displacements of a body (such as the housing, the reference mass, additional reference mass, and/or the Coriolis tube). In general it can be said that the detection means are not limited thereto, but that acceleration, velocity, position, strain and/or force of that specific part may be measured as well.

The excitation means (or further excitation means, or additional excitation means) may comprise a Lorentz actuator, such as a Voicecoil motor-element, and/or a Piezo element.

According to an aspect, the invention provides a method for actively isolating vibrations in a flowsensor of the Coriolis type, such as the flow sensor described above, wherein the flow sensor comprises a Coriolis flow tube and a reference mass that is connected thereto in a flexible manner, wherein the method comprises the step of substantially fixing the position of the reference mass.

According to an aspect, the invention provides a method for actively isolating vibrations in a flowsensor of the Coriolis type, such as the flow sensor described above, wherein the flow sensor comprises a Coriolis flow tube and a reference mass that is movable independently thereof, wherein the method comprises the step of substantially matching the dynamical behavior of the reference mass to the dynamical behavior of the Coriolis tube.

According to an aspect, the active vibration isolation according to the invention may be accomplished together with so-called passive vibration isolation, which is known per se to those skilled in the art. The invention is not limited to the use of active vibration isolation alone.

According to an aspect, the passive vibration isolation for a Coriolis flow sensor may be improved. This is, according to this aspect of the invention, obtained by a Coriolis flow sensor, comprising at least a Coriolis-tube with at least two ends being fixed in a tube fixation means, wherein the flow sensor comprises excitation means for causing the tube to oscillate, as well as detection means for detecting at least a measure of displacements of parts of the tube during operation. The Coriolis flow sensor comprises a compliant connection between the casing and at least part of the detection means. The compliant connection according to this embodiment of the invention is constructed and arranged such that a relative displacement measurement of the tube, dependent on the tube actuation and mass-flow, though independent of casing excitations is obtained. It is noted that this Coriolis flow sensor, having the improved passive vibration isolation described herein, already provides improved results. The Coriolis flow sensor according to the invention may be embodied with either one of passive vibration isolation, or active vibration isolation, and/or both.

The flow sensor according to this aspect of the invention is in an embodiment arranged for causing the detection means to oscillate in response to excitations of the housing, in substantially the same manner as the Coriolis-tube oscillates in response to excitations of the housing.

This may in an embodiment be obtained by tuning the resonance frequency and/or the damping of the compliant detection means. Tuning may be dependent on the actuation frequency of the Coriolis tube, and the first and second Coriolis mode.

The tuning may comprise that the resonance frequency and/or the damping ratio are substantially equal for the Coriolis-tube (i.e. internal mode of the tube-window) and the compliant mounted detection means.

The tuning may in practice comprise that the resonance frequency and/or the damping ratio are lower for the internal mode of the tube-window (Coriolis-tube), compared to the resonance frequency and the damping ratio of the compliant mounted detection means.

The tuning may in an embodiment comprise that the resonance frequency and/or the damping ratio for the internal mode of the tube-window (Coriolis-tube) are approximately 90% of the resonance frequency and the damping ratio of the compliant mounted detection means.

It is conceivable in an alternative embodiment that the resonance frequency and the damping ratio are higher for the internal mode of the tube-window (Coriolis-tube), compared to the resonance frequency and the damping ratio of the compliant mounted detection means.

In addition to the passive vibration isolation described above, active vibration isolation may be used, in particular as described herein. Thus, the active vibration isolation may be accomplished together with the passive vibration isolation.

The invention will be described below by means of the accompanying Figures, which show several embodiments of the invention. In the figures, it is shown.

Figure 1A:
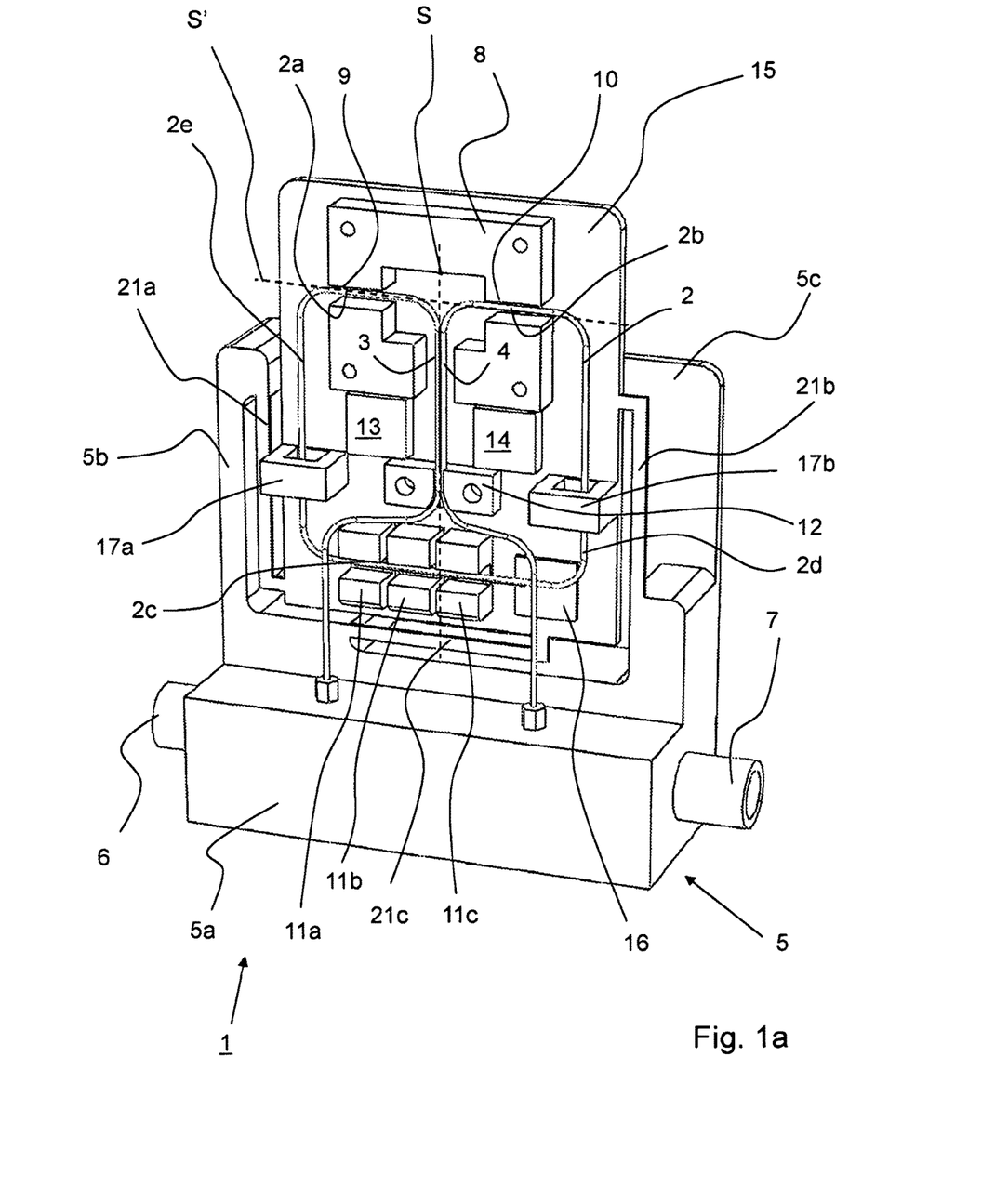
FIG. 1a-c a perspective view, a side view and a dynamical overview of a first embodiment of the flowmeter according to the invention.
Figure 1B:
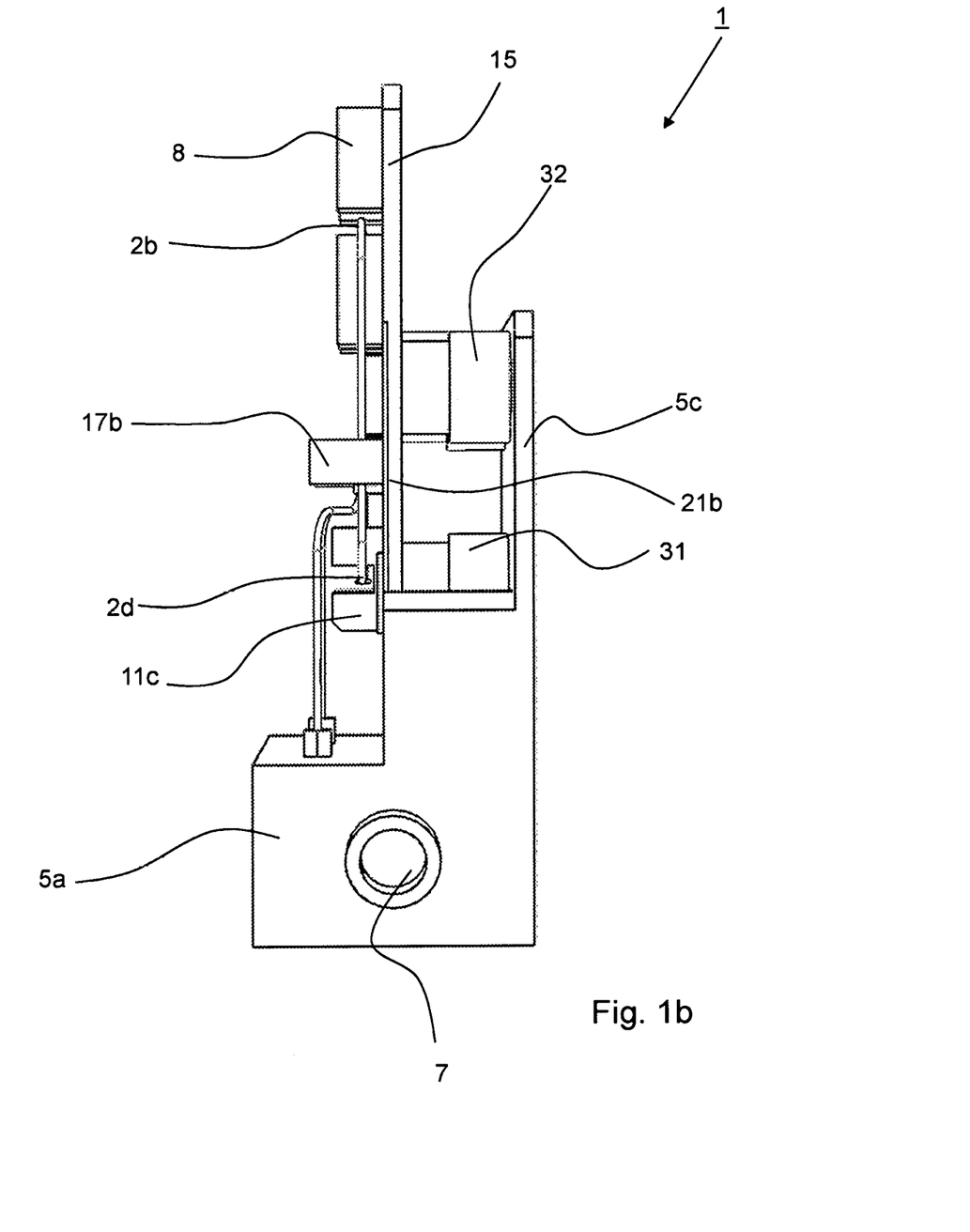

FIG. 1a shows a perspective view of a flowmeter 1 of the Coriolis type (or Coriolis Mass Flow Meter, CMFM), and FIG. 1b shows a side view of said flowmeter 1, according to a first embodiment of the invention. The flowmeter 1 of the Coriolis type has a looped tube 2 that is bent into a rectangular shape so as to follow a substantially circumferential path (substantially one full turn), and that comprises a flexible inlet tube 3 and a flexible outlet tube 4 for a fluid medium. Preferably, the loop 2 and the inlet and outlet tubes 3, 4 are portions of one and the same tube. The tube 2 in its entirety is bent into a rectangular shape, but the corners are rounded such that it can be bent into this shape. The inlet tube 3 is connected to a supply line 6 and the outlet tube 4 to a discharge line 7 via a supply/discharge block 5a, which forms part of a housing 5 or casing 5. The inlet and outlet tubes 3, 4 of this embodiment extend within the loop 2 and are fastened (i.e. clamped) to a frame 15 by fastening means 12. The fastening is provided in a location such that the free path length of the inlet and the outlet tube 3, 4 (i.e. the portion of the inlet/outlet tube 3, 4 between the connection of the second transverse tube portions 2a, 2b and the location of the clamping to the fastening means 12) is at least 50%, preferably 60% of the length of each of the lateral tube portions 2c, 2d, or even longer. The flexible inlet and outlet tubes 3, 4 do not form part of the loop 2 but provide a flexible fastening of the loop 2 to the frame 15. The loop 2 may thus be regarded as being flexibly suspended by means of the inlet and outlet tubes. The loop 2 and the inlet and outlet tubes 3, 4 may advantageously be manufactured from one integral piece of tubing. This may be, for example, a stainless steel tube with an outer diameter of approximately 0.7 mm and a wall thickness of approximately 0.1 mm. Depending on the outer dimensions of the loop 2 and the pressure the tube is to be able to withstand (for example 100 bar), the outer diameter of the tube will usually be smaller than 1 mm and the wall thickness 0.2 mm or less. It is noted that other dimensions may be used as well.

The tube 2 consists of a substantially rectangular framework comprising two parallel lateral tubes 2d and 2e, a first transverse tube 2c connected to first (lower) ends of the lateral tubes 2d and 2e, and two second transverse tubes 2a and 2b connected at one side to second (upper) ends of the lateral tubes and at the other side to the centrally returning inlet and outlet tubes 3 and 4, respectively. The rectangular loop 2 preferably has rounded corners. The tubes 3 and 4, which run closely together on either side of and symmetrically with respect to the main axis of symmetry S of the loop 2, are fastened to the fastening means 12, for example by clamping or soldering or welding, said means 12 in their turn being fastened to the frame 15, which forms a reference mass 15 as will be explained below. The inlet and outlet tubes 3, 4 are flexible and act as it were as a suspension spring for the loop 2. This suspension allows a motion of the loop 2 both about the main axis of symmetry S and about a second axis S' situated in the plane of the loop 2 and perpendicular to the main axis of symmetry S.

To close the loop 2 mechanically (i.e. to interconnect the beginning and end of the loop mechanically, directly or indirectly), the tubes 3, 4 are preferably connected to one another along the extent of their free path lengths, for example in that they are welded or soldered together.

In the construction of FIGS. 1a and 1b the excitation means for causing the loop 2 to oscillate about the main axis of symmetry S (the primary or excitation axis of rotation) comprise a permanent magnet yoke 19 fastened to the reference mass 15, said yoke having two gaps 9 and 10 through which portions 2a and 2b (denoted the second transverse tubes above) of the looped tube 2 are passed, as well as means for introducing an electric current into the tube 2. These are means for inducing a current in the tube 2 in the present case. The permanent magnet yoke 8 may, in an alternative embodiment, be attached to the housing 5 as well.

The current is induced in the tube by means of two transformer cores 17a, 17b provided with respective coils (not shown) through which cores the respective tube portions 2d and 2e are passed. The combination of the magnetic fields generated in the gaps 9 and 10 of the permanently magnetic yoke 8, which fields are transverse to the direction of the current and are oppositely directed, and an (alternating) current induced in the tube 2 exerts a torque on the tube owing to which it starts to oscillate or rotate about the axis S (in the so-termed twist mode). When a medium flows through the tube, the tube will start to rotate about an axis S' transverse to the axis S (in the so-termed swing mode) under the influence of Coriolis forces. During operation the (sinusoidal) displacements of points of the tube portion 2c, which are representative of the flow, are detected by detection means 11 in the form of a first sensor 11a and a second sensor 11b, and optionally a third sensor 11c. The first and the second sensor are arranged on either side of the first axis of rotation S. A third sensor 11c may serve for correction purposes. The sensors may be, for example, of an electromagnetic, inductive, capacitive, or ultrasonic type. In the present case, however, optical sensors are chosen. The sensors 11a, 11b, and 11c each comprise, in the embodiment shown, a U-shaped housing that is fastened to the frame 15, with a light source (for example an LED) placed in the one leg and a photosensitive cell (for example a phototransistor) opposite the light source in the other leg. The lateral tube 2c is capable of moving between the legs of the U-shaped sensor housings 11a and 11b (and 11c, if present). It should be noted that other ways of detecting displacement (or at least a measure of displacement) of the Coriolis tube are conceivable as well.

The configuration of the Coriolis tube, the excitation means and the detection means described above is per se known to those skilled in the art, and is, for example, described in EP 1 719 982 A1, which document is incorporated by reference here.

It can furthermore be seen in FIG. 1a that the frame 15 or reference mass 15 (to which the Coriolis tube 2 is connected by means of fastening means 12) is connected to a main body 5b of the casing 5 by means of suspension means 21. The suspension means 21 comprise a total of three suspension elements 21a, 21b, 21c, preferably in the form of flexible beams 21a, 21b, 21c, which may in an embodiment be flexures or spring-leafs, although alternative arrangements are conceivable. The frame 15 is thus resiliently connected to the casing 5, and the Coriolis tube 2 is resiliently suspended to the frame 15 due to its internal elasticity. On the frame 15, further detection means 13, 14, 16 are provided, which are arranged for detecting vibrations of the frame 15. These further detection means may be arranged for measuring either position, acceleration, velocity, force, or any other quantity that represents a measure of vibration of the frame 15.

As can be seen in FIG. 1b, the flowsensor 1 further comprises a number of further excitation means 31, 32, which are connected between a back wall 5c of the casing 5, and the frame 15. The excitation means 31, 32, may be Piezo actuators, or other actuators. In an embodiment, voice-coil motors are used. In the embodiment shown, a total of three actuators 31, 32 are used (one of which is positioned behind the upper actuator 32. The three actuators 31, 32 are in the embodiment shown, positioned in a isosceles triangular relationship. It is noted however, that in principle any other number of actuators may be used, and that their position may be chosen as desired.

Figure 1C:
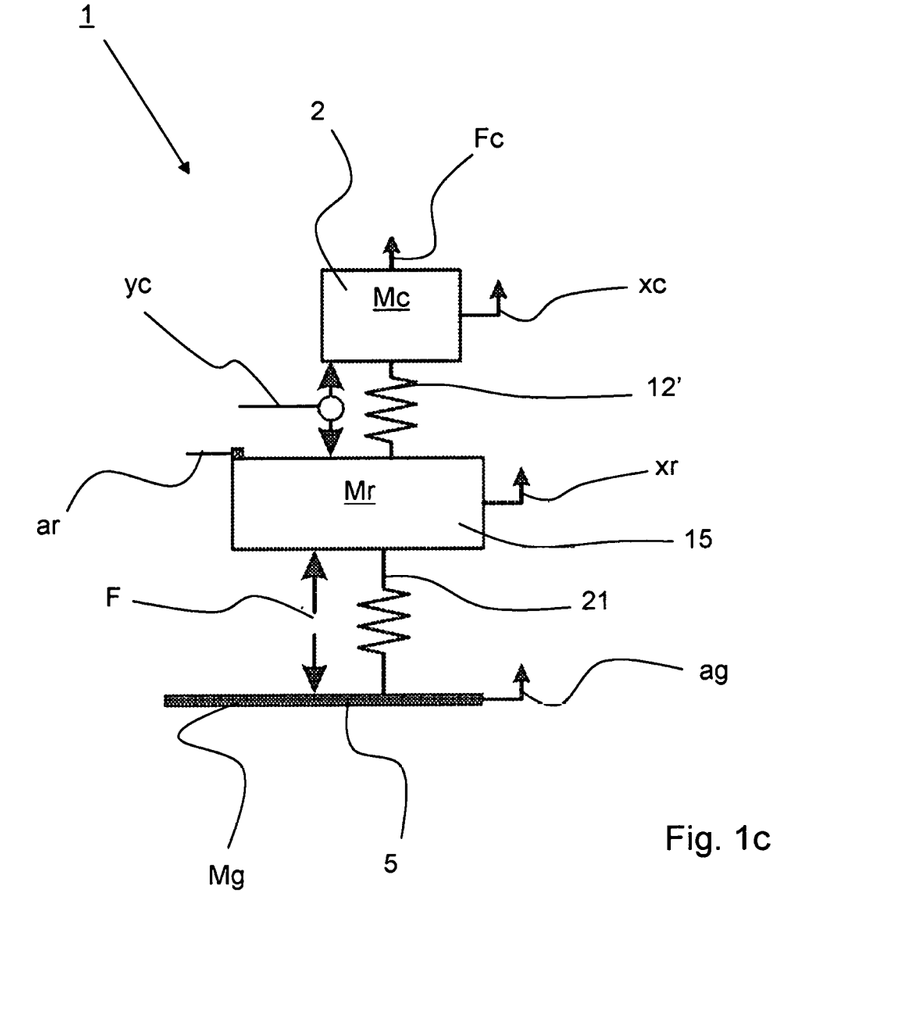

The flowmeter 1 of the Coriolis type as depicted in FIGS. 1a and 1b, and described above, can be represented by the dynamical scheme of the flowmeter 1 shown in FIG. 1c. Corresponding numbers are adhered to. Here it can be seen that the casing 5 represents "ground" Mg. The frame 15 represents a reference mass Mr, and is resiliently connected to the "ground" Mg by means of the suspension means 21. To the reference mass Mr, the Coriolis flow tube 2 is connected by means of a resilient connection 12'. As described above, the internal elasticity of several tube parts 3, 4, 2a, 2b represents the resilient suspension 12' between the Coriolis mass Mc and the reference mass Mr.

The flowmeter of the Coriolis type as shown in FIG. 1a-FIG. 1c, operates according to a first principle of active vibration isolation, in order to minimize the effect external vibrations have on the Coriolis-tube. In the embodiment shown, the Coriolis-tube 2 (Mc), the reference mass 15 (Mr), and the housing (5) are connected in series. The further excitation means 31 connected to the reference mass 15 are used to counter movements ag of the housing 5 so as to substantially fix the absolute position of the reference mass 15. In other words a stable ground is created for the Coriolis-tube 2, yielding that the measurement yc is the true movement of the Coriolis tube induced by the Coriolis Force Fc (see FIG. 1c). Hence, vibrations or other disturbances on the housing 5 do not result in undesired vibrations on the Coriolis-tube 2. In general, a feedback scheme and/or a feedforward scheme is/are used to substantially fix the absolute position of the reference mass 15. At least one actuator element, and at least one sensor element are used for this. In the embodiment shown, a total of three actuator elements 31, 32 are used.

Referring to FIG. 1c, the sensors 11 are arranged, in an embodiment, for measuring a relative displacement yc=xc−xr. The displacement of the Coriolis tube due to a Coriolis force Fc (which is proportional to fluid flow) and due to external vibrations is equal to xc=G1*Fc+G2*ar, in which G1 and G2 denote specific transfer functions. The sensors 11 thus actually measure yc=xc−xr=G1*Fc+G2*ar−xr. By means of a feedforward and/or a feedback control scheme, the position of the reference mass 15 (Mr) may be actively set to an absolute value in which ar=xr=0. With this, the measurements yc obtained by the sensors 11 has become dependent on the flow only: yc=G1*Fc.

Figure 2A:
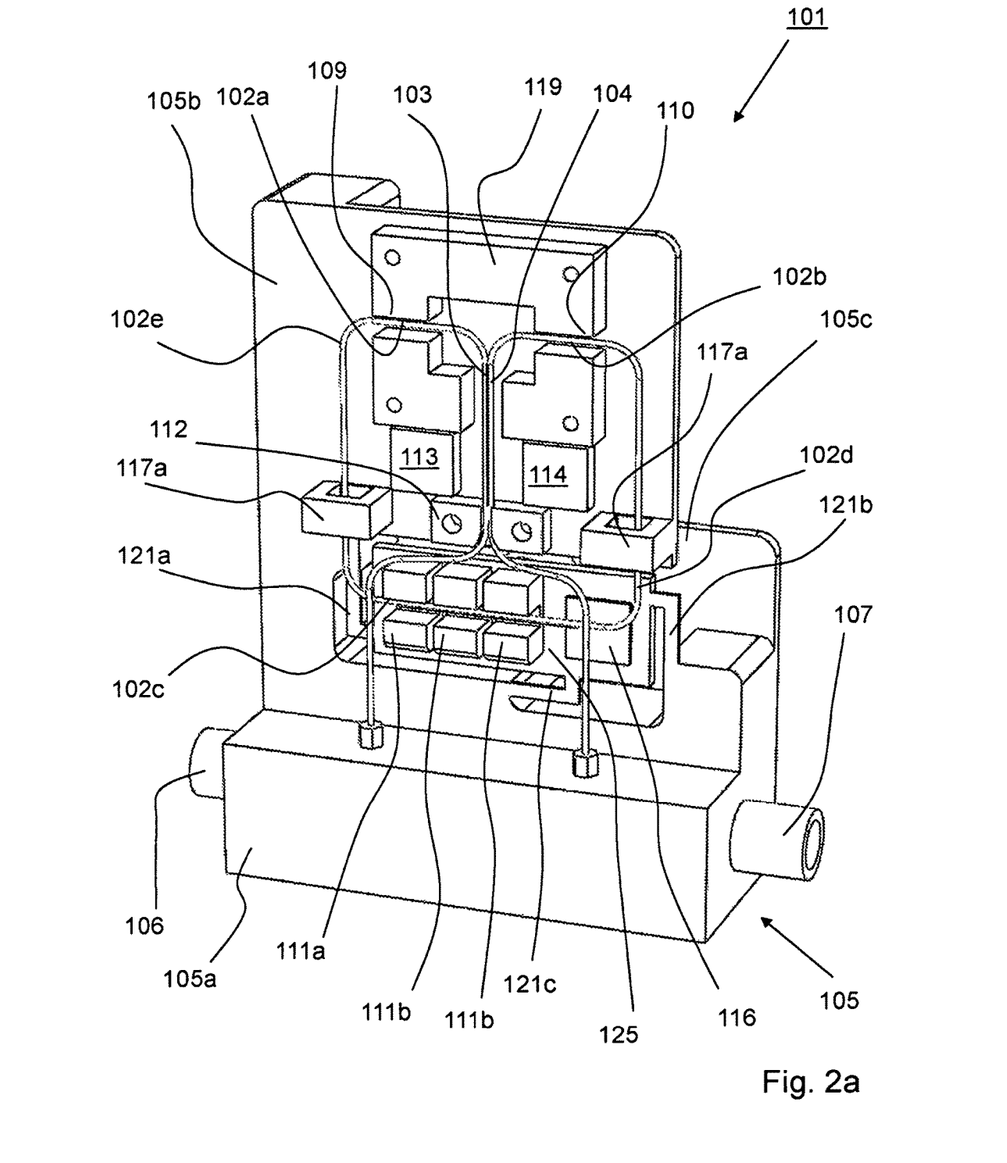
FIG. 2a-c a perspective view, a side view and a dynamical overview of a second embodiment of the flowmeter according to the invention.
Figure 2B:
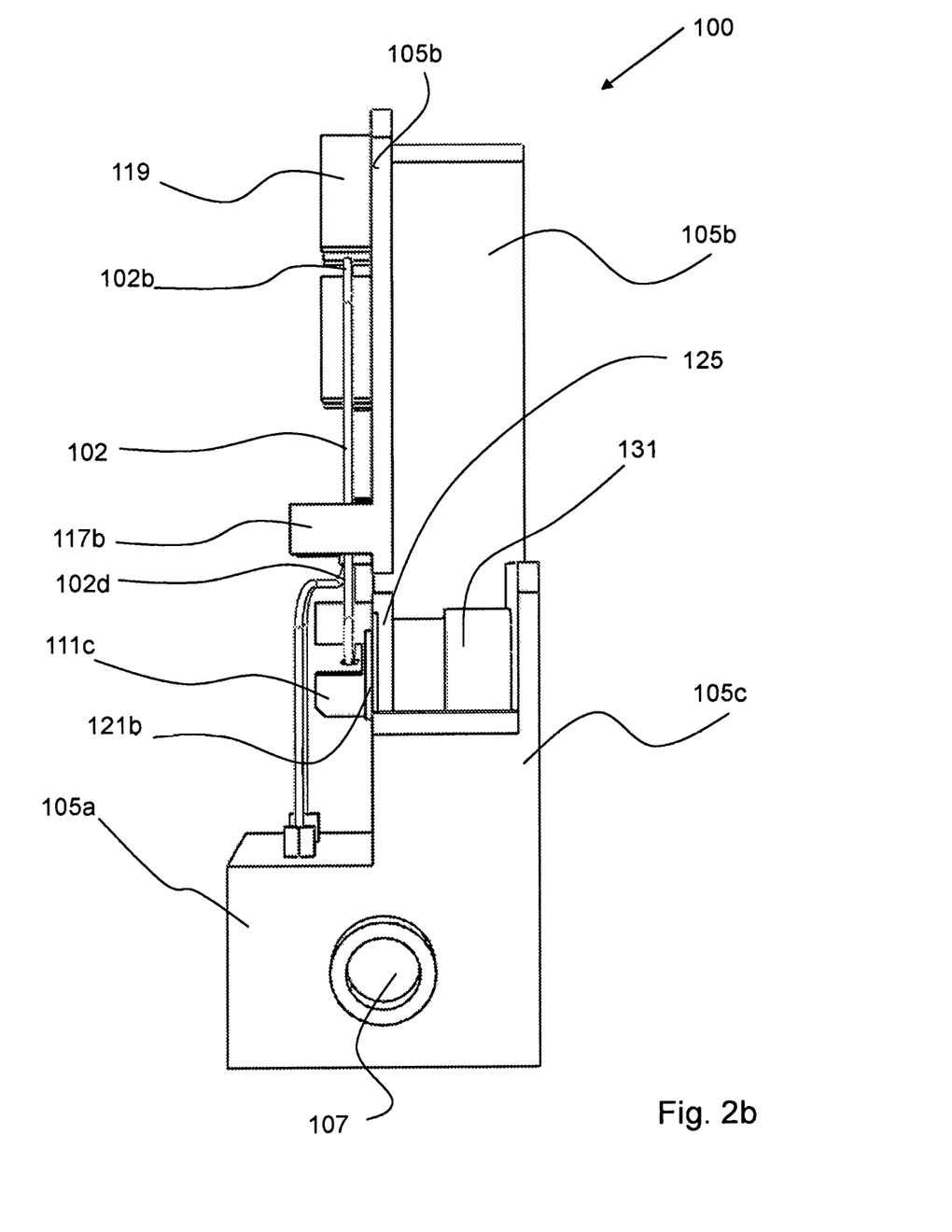
Figure 2C:
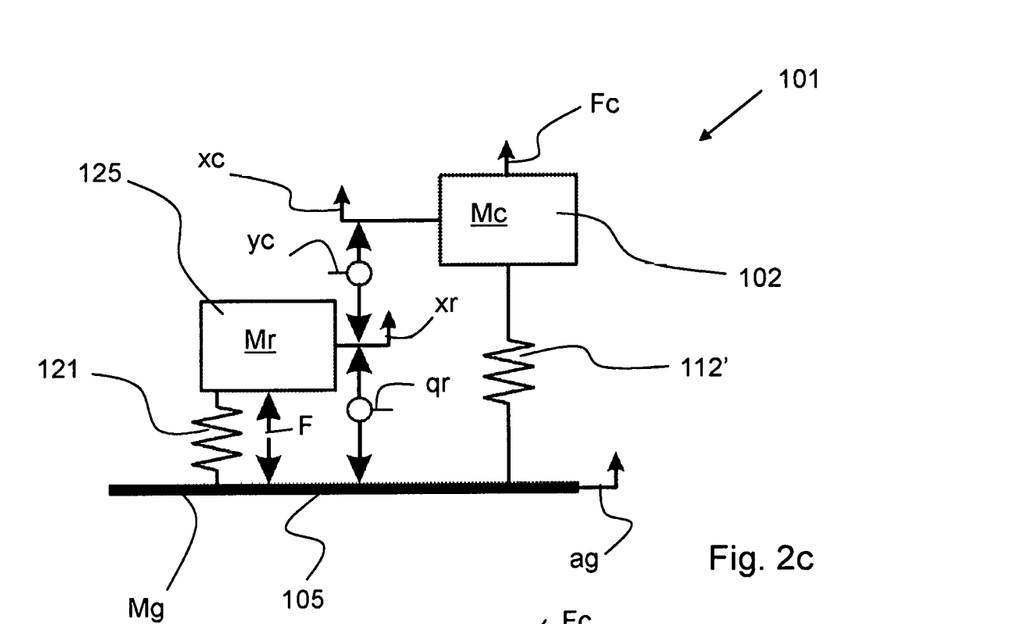

An alternative embodiment of the flowmeter 101 of the Coriolis type according to the invention, is shown in FIG. 2a-2c. In general, the same reference signs, increased by 100, are used. In general, it is referred to the description of FIGS. 1a and 1b, which largely applies to this embodiment. For completeness sake, a short summary will be given below.

FIG. 2a shows a perspective view of a flowmeter 101 of the Coriolis type, and FIG. 2b shows a side view of said flowmeter 101, according to a second embodiment of the invention. The flowmeter 101 of the Coriolis type has a looped tube 102 that is bent into a rectangular shape, with a flexible inlet tube 103 and a flexible outlet tube 104 for a fluid medium. The inlet tube 103 is connected to a supply line 106 and the outlet tube 104 to a discharge line 107 via a supply/discharge block 105a, which forms part of a casing 105. The tube 102 comprises two parallel lateral tubes 102d and 102e, a first transverse tube 102c connected to first (lower) ends of the lateral tubes 102d and 102e, and two second transverse tubes 102a and 102b connected at one side to second (upper) ends of the lateral tubes and at the other side to the centrally returning inlet and outlet tubes 103 and 104, respectively.

Excitation means 119 are provided, comprising a permanent magnet yoke fastened to the main body 105b of the casing 105, said yoke having two gaps 109 and 110 through which portions 102a and 102b (denoted the second transverse tubes above) of the looped tube 102 are passed. Transformer cores 117a, 117b are provided for inducing a current, to exert a torque on the tube owing to which it starts to oscillate or rotate about the axis S (in the so-termed twist mode). Detection means 111 are provided, in the form of a first sensor 111a and a second sensor 111b, and optionally a third sensor 111c.

In the embodiment shown, the tubes 103 and 104, are fastened to the fastening means 112, for example by clamping or soldering or welding, said means 112 in their turn being fastened to the main body 105b of the casing 105. Note, in this sense, that the fastening means 112 are directly connected to the main body 105b of the casing 105.

Connected to the main body 105b of the casing 105 is further frame 125. The frame 125 is resiliently connected, by means of suspension means 121, which comprise in the embodiment shown a total of three suspension elements 121a, 121b, 121c in the form of flexible beams, preferably flexure elements or spring-leaf like elements. Further detection means 116 are provided, which are arranged for determining vibrations of the frame 125.

As can be seen in FIG. 2c, a further excitation means 131 is provided, which may be used to excite the frame 125.

FIG. 2c shows a dynamical scheme of the embodiment of the flowmeter 101 as shown in FIGS. 2a and 2b. Here it can be seen that the frame 125 defines a reference mass Mr, which is resiliently connected by means of the suspension means 121 to the "ground mass" formed by the casing 105. The Coriolis flow tube 102 defines a Coriolis mass Mc, and is directly connected, in a resilient manner, by means of a resilient suspension 112' (formed by internal elasticity of one or more of the Coriolis tube parts) to the "ground mass" formed by the casing 105. Thus, the reference mass 125 and the Coriolis tube 102 are connected in parallel to each other.

The embodiment of the flowmeter 101 of the Coriolis type as shown in FIG. 2a-2c works on a second principle of active vibration isolation. In this second principle, the Coriolis-tube 102 (Mc) and the reference mass 125 (Mr) are positioned in parallel to each other, each being connected to the housing 105. The further excitation means 131 are used to match the dynamic properties of the reference mass 125 with the dynamic properties of the Coriolis-tube 102. Disturbances due to external vibrations acting on the housing 105 act on both the reference mass 125 and the Coriolis-tube 102, in a similar manner. Thus, the relative displacements of the Coriolis tube are at least substantially dependent on the Coriolis force and independent on the external vibrations. It is noted in this regards that the sensors elements 111a-111c of the detection means 111 are in this embodiment provided on the reference mass 125, such that the sensor elements 111a-111c are able to measure the Coriolis force induced vibrations xc on the Coriolis-tube.

In the embodiment shown in FIG. 2c, the sensors 111 are arranged for measuring a relative displacement yc=xc−xr. Displacement yc of the Coriolis tube, due to a Coriolis force Fc (which is proportional to fluid flow) and due to external vibrations equals xc=G1*Fc+G3*ag; with G1 and G3 being specific transfer functions. Now in this embodiment, movement of the reference mass Mr equals xr=G4*ag. With this, the sensors 111 are arranged for measuring yc=xc−xr=G1*Fc+(G3−G4)*ag. The measurement of the sensors 111 is dependent on the fluid flow only, when G3 equals G4 (in other words, when dynamic properties of the reference mass match those of the Coriolis tube). A feedback and/or feedforward control scheme may be used to achieve this.

Figure 3:
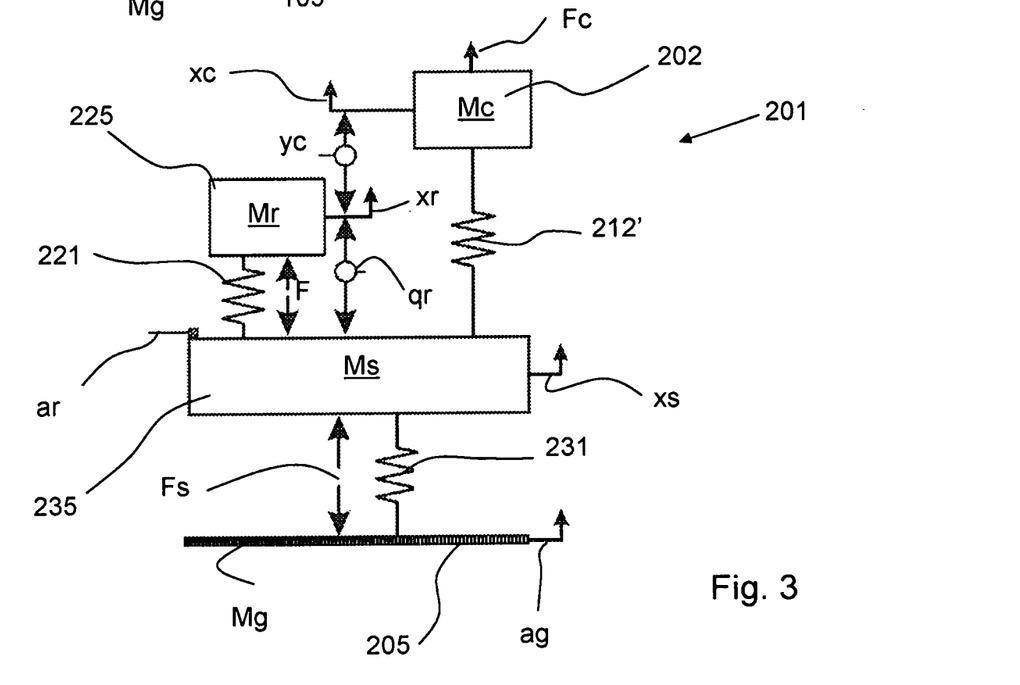
FIG. 3 a dynamical overview of a third embodiment of the flowmeter according to the invention.

FIG. 3, shows a dynamic representation of a further embodiment of the flowmeter 201 according to the invention. This flowmeter 201 makes use of the first and second principle described above. The flowmeter 201 comprises, a housing 205 (Mg). Connected thereto, is an additional reference mass 235 (Ms). The additional reference mass 235 is resiliently connected to the housing 205, by means of one or more spring elements 231. Connected to the additional reference mass 235 are a reference mass 225 (Mr) and a Coriolis tube 202 (Mc). The Coriolis tube 202 is resiliently suspended due to internal elasticity, which is denoted by reference sign 212'. The Coriolis tube 202 and the reference mass 225 are connected in parallel to each other. Both the reference mass 225 and the Coriolis tube 202 are resiliently connected to the additional reference mass 235. As can be seen, this embodiment is basically a combination of FIG. 2c and FIG. 1c.

The flowmeter 201 makes use of a combined principle of active vibration isolation, in this sense that the additional reference mass uses additional excitation means (not shown) and additional detection means to detect vibrations and/or movements of the housing 205, and to substantially fix the absolute position xs of the additional reference mass. This provides a stable base for the Coriolis tube 202. Then the reference mass 225 with further excitation means and further detection means may be used to match the dynamic properties of the reference mass 225 to the dynamic properties of the Coriolis tube 202, such that any disturbances acting on the housing (and which are not countered by the additional mass) or on the reference mass 235 have the same effect on the reference mass 225 and the Coriolis tube, and the Coriolis displacement may be more accurately measured.

According to the embodiment shown in FIG. 3, the sensors 211 are arranged for measuring a relative displacement yc=xc−xr. The displacement of the Coriolis tube due to a Coriolis force (which is proportional to fluid flow) and due to external vibrations equals xc=G1*Fc+G5*xs. In this case, the displacement of the reference mass equals xr=G6*xs. Here, the sensors 211 are thus arranged for measuring yc=G1*Fc+(G5−G6)*xs. The dynamical properties of the reference mass may be matched to those of the Coriolis tube, such that G5=G6. The reference mass may be set to an absolute position, using a feedback and/or feedforward control scheme, such that as=xs=0. This leads to the result that the measurement depends only on the fluid flow; yc=G1*Fc.

Figure 4A:
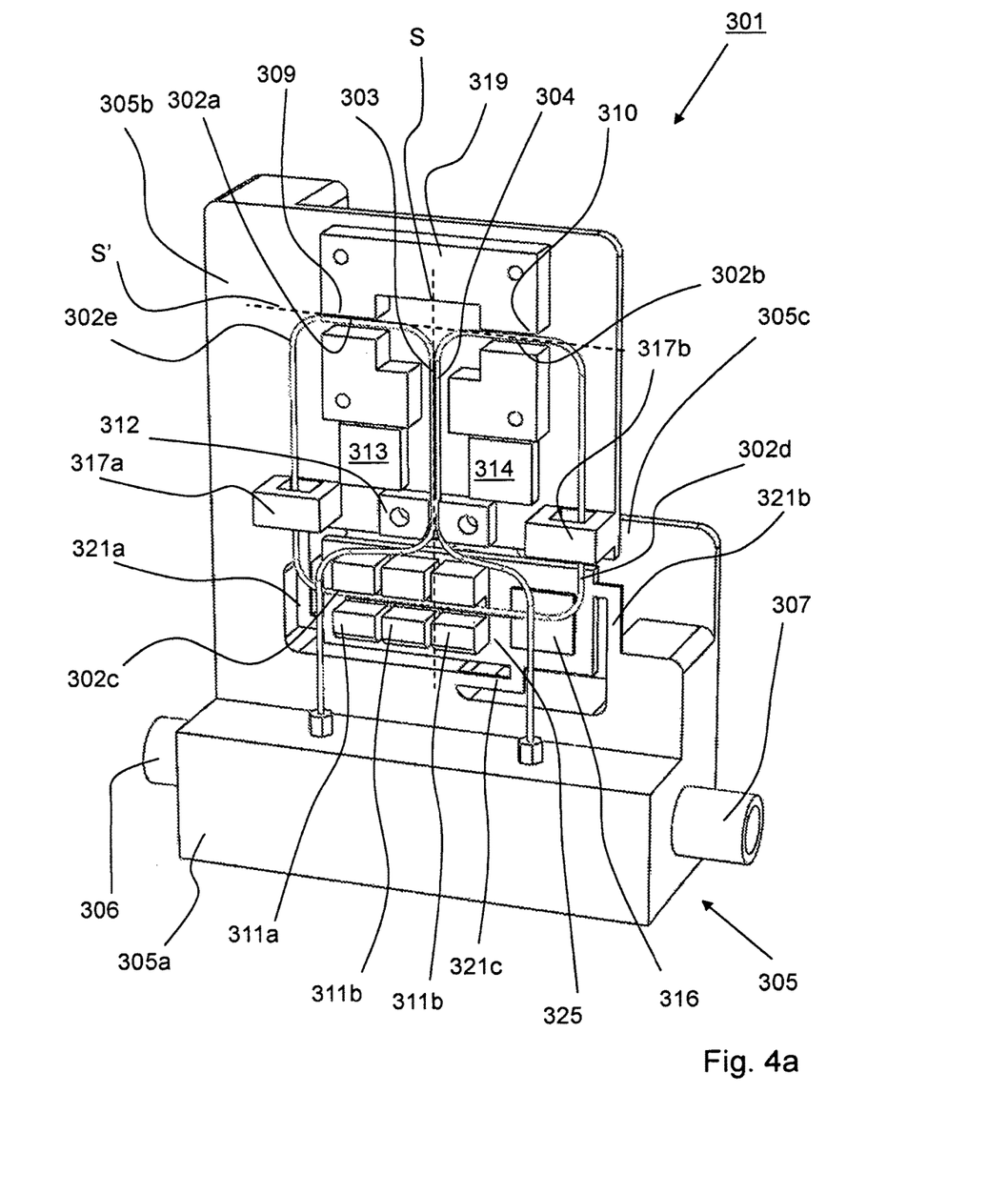
FIG. 4a-c a perspective view, a side view and a dynamical overview of a third embodiment of the flowmeter according to the invention.
Figure 4B:
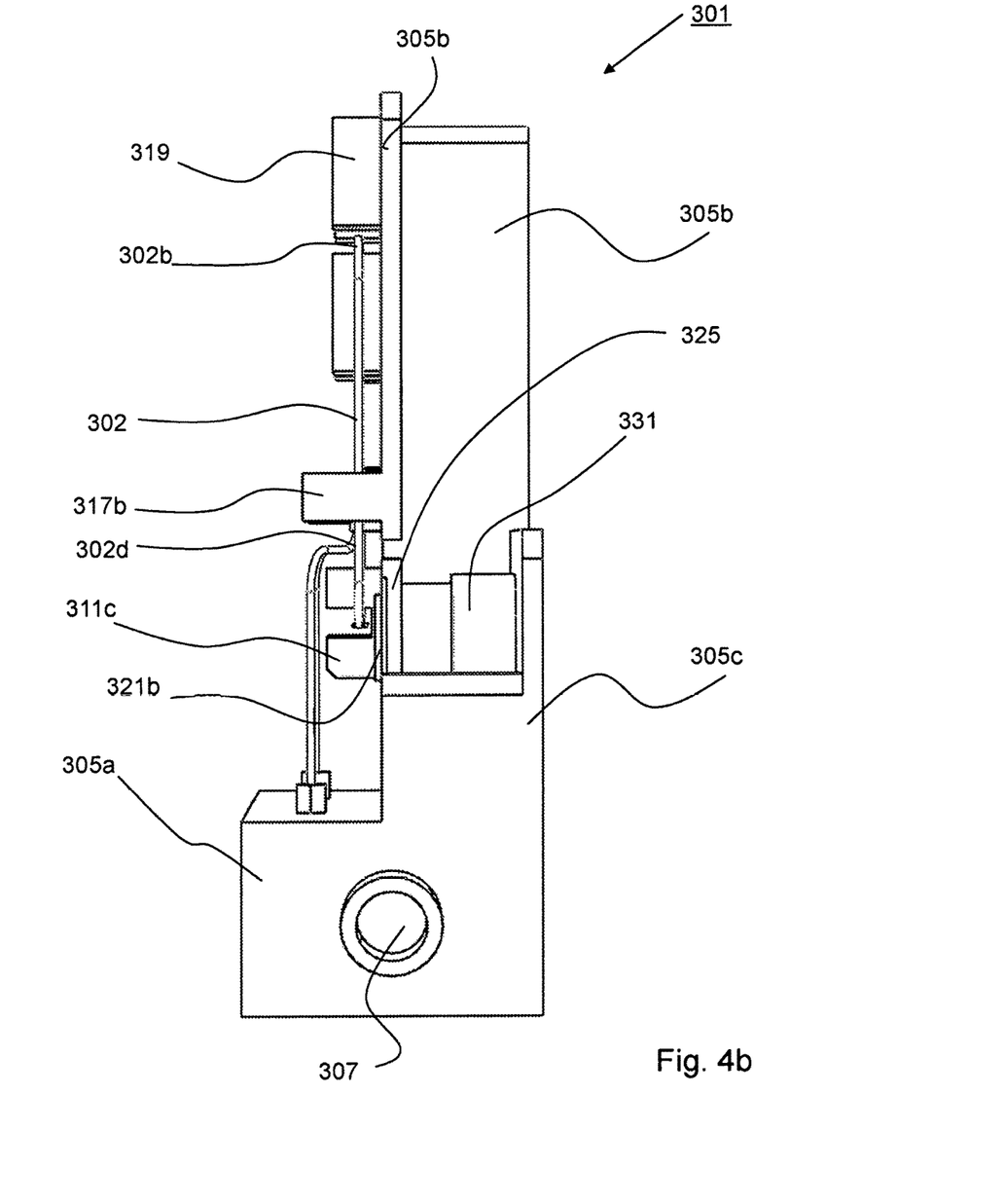

FIG. 4a shows a perspective view of a flowmeter 301 of the Coriolis type (or Coriolis Mass Flow Meter, CMFM), and FIG. 4b shows a side view of said flowmeter 301, according to an embodiment of the invention wherein passive vibration isolation is incorporated into the Coriolis flow sensor. As already described for FIGS. 1a and 1b, the flowmeter 301 of the Coriolis type has a looped tube 302 that is bent into a rectangular shape so as to follow a substantially circumferential path (substantially one full turn), and that comprises a flexible inlet tube 303 and a flexible outlet tube 304 for a fluid medium. Preferably, the loop 302 and the inlet and outlet tubes 303, 304 are portions of one and the same tube. The tube 302 in its entirety is bent into a rectangular shape, but the corners are rounded such that it can be bent into this shape. The inlet tube 303 is connected to a supply line 306 and the outlet tube 304 to a discharge line 307 via a supply/discharge block 305a, which forms part of a casing 305. The inlet and outlet tubes 303, 304 of this embodiment extend within the loop 302 and are fastened (i.e. clamped) to the casing 305 by fastening means 312. The fastening is provided in a location such that the free path length of the inlet and the outlet tube 303, 304 (i.e. the portion of the inlet/outlet tube 303, 304 between the connection of the second transverse tube portions 302a, 302b and the location of the clamping to the fastening means 312) is at least 50%, preferably 60% of the length of each of the lateral tube portions 302c, 302d, or even longer. The flexible inlet and outlet tubes 303, 304 do not form part of the loop 302 but provide a flexible fastening of the loop 302 to the casing 305. The loop 302 may thus be regarded as being flexibly suspended by means of the inlet and outlet tubes. The loop 302 and the inlet and outlet tubes 303, 304 may advantageously be manufactured from one integral piece of tubing. This may be, for example, a stainless steel tube with an outer diameter of approximately 0.7 mm and a wall thickness of approximately 0.1 mm. Depending on the outer dimensions of the loop 302 and the pressure the tube is to be able to withstand (for example 100 bar), the outer diameter of the tube will usually be smaller than 1 mm and the wall thickness 0.2 mm or less. It is noted that other dimensions may be used as well.

The tube 302 consists of a substantially rectangular framework comprising two parallel lateral tubes 302d and 302e, a first transverse tube 302c connected to first (lower) ends of the lateral tubes 302d and 302e, and two second transverse tubes 302a and 302b connected at one side to second (upper) ends of the lateral tubes and at the other side to the centrally returning inlet and outlet tubes 303 and 304, respectively. The rectangular loop 302 preferably has rounded corners. The tubes 303 and 304, which run closely together on either side of and symmetrically with respect to the main axis of symmetry S of the loop 302, are fastened to the fastening means 312, for example by clamping or soldering or welding, said means 312 in their turn being fastened to the casing 305. The inlet and outlet tubes 303, 304 are flexible and act as it were as a suspension spring for the loop 302. This suspension allows a motion of the loop 302 both about the main axis of symmetry S and about a second axis S' situated in the plane of the loop 302 and perpendicular to the main axis of symmetry S.

To close the loop 302 mechanically (i.e. to interconnect the beginning and end of the loop mechanically, directly or indirectly), the tubes 303, 304 are preferably connected to one another along the extent of their free path lengths, for example in that they are welded or soldered together.

In the construction of FIGS. 1a and 1b the excitation means for causing the loop 302 to oscillate about the main axis of symmetry S (the primary or excitation axis of rotation) comprise a permanent magnet yoke 319 fastened to the casing 305, said yoke having two gaps 309 and 310 through which portions 302a and 302b (denoted the second transverse tubes above) of the looped tube 302 are passed, as well as means for introducing an electric current into the tube 302. These are means for inducing a current in the tube 302 in the present case.

The current is induced in the tube by means of two transformer cores 317a, 317b provided with respective coils (not shown) through which cores the respective tube portions 302d and 302e are passed. The combination of the magnetic fields generated in the gaps 309 and 310 of the permanently magnetic yoke 319, which fields are transverse to the direction of the current and are oppositely directed, and an (alternating) current induced in the tube 302 exerts a torque on the tube owing to which it starts to oscillate or rotate about the axis S (in the so-termed twist mode). When a medium flows through the tube, the tube will start to rotate about an axis S' transverse to the axis S (in the so-termed swing mode) under the influence of Coriolis forces. During operation the (sinusoidal) displacements of points of the tube portion 302c, which are representative of the flow, are detected by detection means 311 in the form of a first sensor 311a and a second sensor 311b, and optionally a third sensor 311c. The first and the second sensor are arranged on either side of the first axis of rotation S. A third sensor 311c may serve for correction purposes. The sensors may be, for example, of an electromagnetic, inductive, capacitive, or ultrasonic type. In the present case, however, optical sensors are chosen. The sensors 311a, 311b, and 311c each comprise, in the embodiment shown, a U-shaped housing that is fastened to the frame 315, with a light source (for example an LED) placed in the one leg and a photosensitive cell (for example a phototransistor) opposite the light source in the other leg. The lateral tube 302c is capable of moving between the legs of the U-shaped sensor housings 311a and 311b (and 311c, if present). It should be noted that other ways of detecting displacement (or at least a measure of displacement) of the Coriolis tube are conceivable as well.

In the embodiment shown, the tubes 303 and 304, are fastened to the fastening means 312, for example by clamping or soldering or welding, said means 312 in their turn being fastened to the main body 305b of the casing 305. Note, in this sense, that the fastening means 312 are directly connected to the main body 305b of the casing 305.

Connected to the main body 305b of the casing 305 is further frame 325. The further frame 325 is resiliently connected, by means of suspension means 321, which comprise in the embodiment shown a total of three suspension elements 321a, 321b, 321c in the form of flexible beams, preferably flexure elements or spring-leaf like elements. On the further frame 325, the detection means 311 are provided.

According to an aspect of the invention, which is in particular related to passive vibration isolation, a compliant connection 321 between the casing 305 and the detection means 311 is present. The compliant connection 321 according to the invention is constructed and arranged such that a relative displacement measurement of the tube 302, dependent on the tube 302 actuation and mass-flow, though substantially independent of casing 305 excitations is obtained. In other words, the further frame 325 with the detection means 311 is arranged to oscillate, in response to casing 305 excitations, in substantially the same manner as the Coriolis-tube 302 oscillates in response to said same casing 305 excitations. Thus, the influence of external casing excitations does not result in a relative movement between the Coriolis-tube 302 and the detection means 311.

Figure 4C:
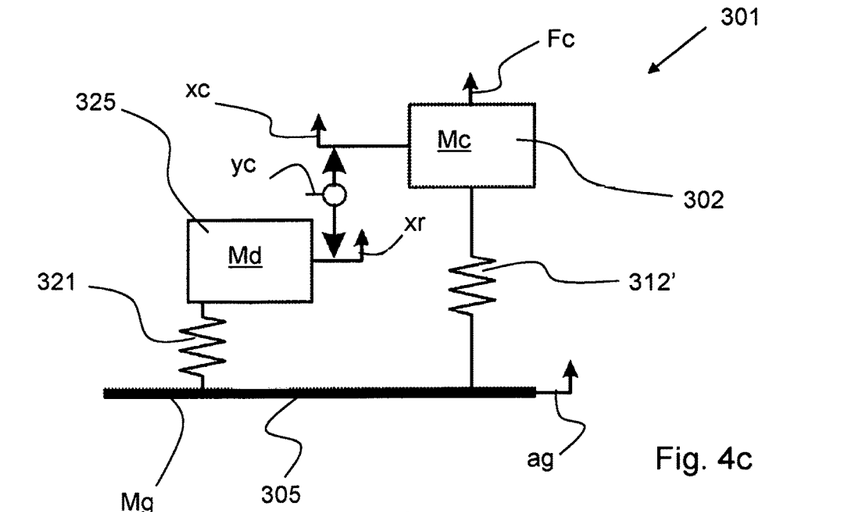

FIG. 4c shows a dynamical scheme of the embodiment of the flowmeter 301 as shown in FIGS. 4a and 4b. Here it can be seen that the frame 325 with the detection means 311 is resiliently connected by means of the suspension means 321 to the "ground mass" formed by the casing 305. The Coriolis flow tube 302 defines a Coriolis mass Mc, and is directly connected, in a resilient manner, by means of a resilient suspension 312' (formed by internal elasticity of one or more of the Coriolis tube parts) to the "ground mass" formed by the casing 305. Thus, the detection means 325 and the Coriolis tube 302 are connected in parallel to each other.

The placement and the characteristics of the compliant connection 321, as well as design of the flow sensor (including design for masses Md and Mc of the frame 325 with detection means, and the Coriolis tube, respectively, may be designed in order to obtain the desired effect. In particular, the compliant connection 321 is arranged and designed such that the resonance frequency and/or the damping of the compliant detection means 311 are tuned such that the dynamic response to external vibrations on the casing is substantially equal to said response of the Coriolis tube.

As followed from the above, the Coriolis flow-sensor thus comprises passive vibration isolation means. In the embodiment shown in FIGS. 4a and 4b, the Coriolis flow-sensor also comprises active vibration isolation means, such as described for FIGS. 1-3, although these means are entirely optional. In summary, referring to FIGS. 4a and 4b, a further excitation means 331 is provided, which may be used to actively excite the further frame 325 as a reference mass, and further detection means 316 are provided, to measure the oscillations of the reference mass.

The Coriolis-tube 302 (having mass Mc) and the reference mass Md provided by the frame 325 are positioned in parallel to each other, each being connected to the housing 305. The further excitation means 331 are used to match the dynamic properties of the reference mass 325 with the dynamic properties of the Coriolis-tube 302. Disturbances due to external vibrations acting on the housing 305 act on both the reference mass 325 and the Coriolis-tube 302, in a similar manner. Thus, the relative displacements of the Coriolis tube are at least substantially dependent on the Coriolis force and independent on the external vibrations. It is noted in this regards that the sensors elements 311a-311c of the detection means 311 are in this embodiment provided on the reference mass 325, such that the sensor elements 311a-311c are able to measure the Coriolis force induced vibrations xc on the Coriolis-tube 302.

Figure 5:
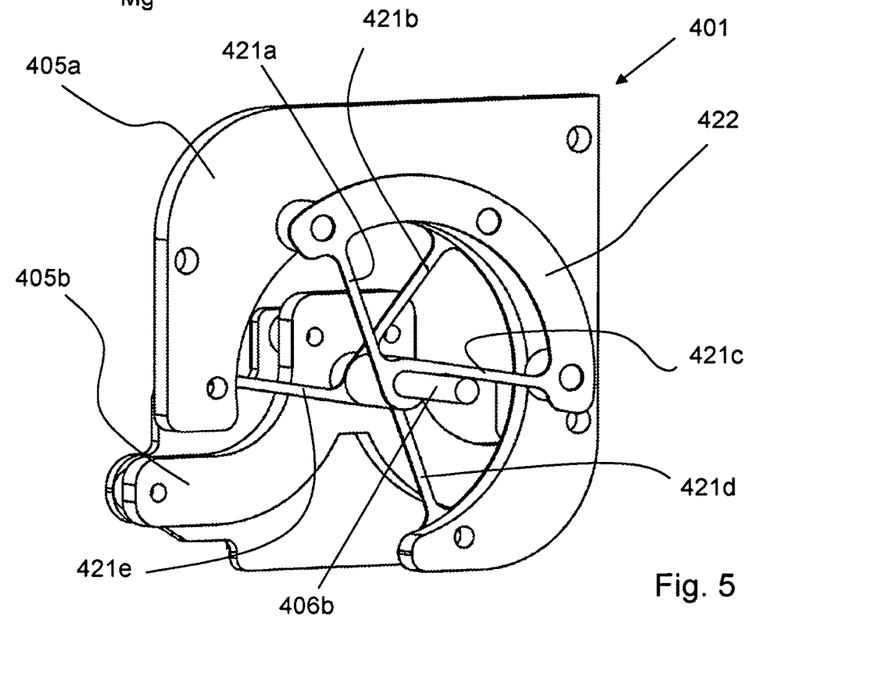
FIG. 5 an embodiment of a compliant sensor design for passive vibration isolation according to an aspect of the invention.

An embodiment of a device 401 having passive vibration isolation is shown in FIG. 5. The device 401 comprises a casing part 405a and a frame part 405b. The frame part 405b has a compliant connection 421 to the casing part 405a. In the embodiment shown, several wire springs 421a-421e are used, which are arranged in such a manner to provide an exactly constraint configuration with only one remaining degree of freedom, which is along the longitudinal length of cylinder 406b. The device 401 may be used in a flow sensor of the Coriolis type, wherein the Coriolis tube is connected to the casing 405a, and detections means are provided on the frame part 405b, such that the detection means are resiliently connected to the casing. The Coriolis tube is provided in such a way that the only remaining degree of freedom is out of plane of the tube-window. This results in an extra degree of freedom between the casing 405a and the frame 405b, which preferably comprises a printed circuit board (PCB) with the detection means in the form of optical sensors.

The resilient connection, in the embodiment shown provided by flexures, or leaf springs, provides damping and stiffness. The connection of the Coriolis tube to the casing also entails damping and stiffness. Perfect vibration isolation may be achieved when the following conditions are met:

damping of the detection means dd is equal to damping of the Coriolis tube dc times the ratio between the mass of the detection means md and the mass of the Coriolis tube mc: dd=(md/mc) dc; and stiffness of the detection means kd is equal to stiffness of the Coriolis tube kc times the ratio between the mass of the detection means md and the mass of the Coriolis tube mc: kd=(md/mc) kc.

These conditions are in general achieved when the resonance frequency and the damping ratio are equal for the internal mode of the tube window and the compliant mounted detection means.

It is noted that for the design shown in FIG. 5, a perfect match of the damping ratio and the resonance frequency no longer results in perfect vibration isolation because of the higher order dynamics of the tube window. Fortunately, mistuning of those parameters can be used advantageously to minimise the transmissibility in the region of interest by the introduction of an anti-resonance. Therefore the concept device 401 shown in FIG. 5 is mistuned on purpose.

In the case shown in FIG. 5, the damping and resonance frequencies for the internal mode of the tube-window (Coriolis-tube) are approximately 90% of those of the compliant mounted detection means (frame 405b). With the design, a 20 dB attenuation of the influence of external vibrations on the mass-flow measurement value of a CMFM may be obtained.

The device 401 shown in FIG. 5—as well as concepts described above in relationship to Coriolis flow sensors—can in principle be used in every flow sensor of the Coriolis type, and even in other kinds of systems were specific internal deformations need to be measured independently of external vibrations.

In particular, the passive vibration isolation described in the embodiments of FIGS. 4 and 5 can be incorporated into the Coriolis flow sensors as described in FIGS. 1 to 3.

The invention is described above by means of a number of embodiments. These embodiments and the description thereof are not to be construed limiting on the invention. The invention and its desired protection is defined by the appended claims.

The Coriolis flow sensor having passive vibration isolation may be described by means of the following clauses:

Clause 1. Coriolis flow sensor, comprising a housing and at least a Coriolis-tube with at least two ends being fixed in a tube fixation means, wherein the flow sensor comprises excitation means for causing the tube to oscillate, as well as detection means for detecting at least a measure of displacements of parts of the tube during operation, characterized in that it comprises a compliant connection between the casing and at least part of the detection means.

Clause 2. Coriolis flow sensor according to clause 1, wherein the flow sensor is arranged for causing the detection means to oscillate in response to casing excitations, in substantially the same manner as the Coriolis-tube oscillates in response to casing excitations.

Clause 3. Coriolis flow sensor according to clause 2, wherein the resonance frequency and/or the damping ratio are substantially equal for the Coriolis-tube and the compliant mounted detection means.

Clause 4. Coriolis flow sensor according to clause 2, wherein the resonance frequency and/or the damping ratio are lower for the internal mode of the tube-window, compared to the resonance frequency and the damping ratio of the compliant mounted detection means.

Clause 5. Coriolis flow sensor according to clause 4, wherein the resonance frequency and/or the damping ratio for the Coriolis-tube are approximately 90% of the resonance frequency and the damping ratio of the compliant mounted detection means.

Clause 6. Coriolis flow sensor according to clause 2, wherein the resonance frequency and/or the damping ratio is/are higher for the internal mode of the Coriolis-tube, compared to the resonance frequency and the damping ratio of the compliant mounted detection means.

Clause 7. Coriolis flow sensor according to any of the previous clauses, additionally comprising the features of the Coriolis flow sensor according to any of the following claims 1-20.

The invention claimed is:

1. A Coriolis flow sensor comprising a housing and at least a Coriolis tube with at least two ends being fixed to the housing, wherein the flow sensor comprises excitation means for causing the tube to oscillate, as well as detection means for detecting at least a measure of displacements of parts of the tube during operation, characterized in that the Coriolis flow sensor comprises:
a reference mass;
further excitation means arranged for causing the reference mass to oscillate with respect to the housing;
a further detector arranged for detecting at least a measure of displacements of the reference mass and/or the housing during operation; and
a controller for controlling the excitation means and/or the further excitation means based on movements measured by the detection means and/or the further detector,
wherein the reference mass comprises the excitation means for the Coriolis tube or the detection means for the Coriolis tube.

2. The Coriolis flow sensor of claim 1, wherein the reference mass is connected to the housing.

3. The Coriolis flow sensor of claim 2, wherein the reference mass is connected to the housing by means of spring elements.

4. The Coriolis flow sensor of claim 1, wherein the controller is arranged for moving the reference mass in opposite directions to movements of the housing.

5. The Coriolis flow sensor of claim 1, wherein the further excitation means are provided between the housing or a part rigidly connected to the housing and to the reference mass.

6. The Coriolis flow sensor of claim 1, wherein the further excitation means comprise at least three excitation members, and wherein the detection means comprise at least three detection members.

7. The Coriolis flow sensor of claim 1, wherein the further detector is arranged for detecting at least a measure for movements of the housing or a part rigidly connected thereto.

8. The Coriolis flow sensor of claim 7, wherein the controller is arranged for moving the reference mass with respect to the housing based on feedforward control.

9. The Coriolis flow sensor of claim 1, wherein the further detector is arranged for detecting at least a measure for movements of the reference mass, and wherein the controller is arranged for moving the reference mass based on feedback control.

10. The Coriolis flow sensor of claim 1, wherein the further detector is arranged for detecting movements of the housing, and wherein additional detectors are provided for detecting movements of the reference mass, and wherein the controller is arranged for moving the reference mass with respect to the housing based on both feedforward control and feedback control.

11. The Coriolis flow sensor of claim 1, wherein the controller is arranged for moving the reference mass substantially identically to the Coriolis tube in response to movements of the housing.

12. The Coriolis flow sensor of claim 1, wherein the control means are arranged for moving the reference mass based on feedback control or on feedforward control, wherein use is made of signals of the further detection means.

13. The Coriolis flow sensor of claim 1, comprising an additional reference mass connected to the reference mass, an additional excitation means arranged for causing the additional reference mass to oscillate, as well as an additional detector for detecting at least a measure for displacements of the additional reference mass during operation.

14. The Coriolis flow sensor of claim 13, wherein the controller is arranged for moving the additional reference mass substantially identically to the Coriolis tube in response to movements of the reference mass.

15. The Coriolis flow sensor of claim 1, wherein the detection means and/or the further detector, and/or an additional detector are arranged for measuring acceleration, velocity, position, strain and/or force of the Coriolis tube, the reference mass and/or the housing.

16. The Coriolis flow sensor of claim 1, wherein the excitation means and/or the further excitation means, and/or an additional excitation means comprise an excitation member in the form of a Lorentz actuator, a Voicecoil motor-element, a reluctance actuator and/or a Piezo element.

17. The Coriolis flow sensor of claim 1, comprising a compliant connection between the housing and at least part of the detection means.

18. The Coriolis flow sensor of claim 17, wherein the flow sensor is arranged for causing the detection means to oscillate in response to housing excitations, in substantially the same manner as the Coriolis tube oscillates in response to housing excitations.

19. The Coriolis flow sensor of claim 18, wherein a resonance frequency and/or a damping ratio are substantially equal for the Coriolis tube and the compliant mounted detection means.

20. The Coriolis flow sensor of claim 18, wherein a resonance frequency and/or a damping ratio are lower for an internal mode of the Coriolis tube, compared to a resonance frequency and a damping ratio of the compliant mounted detection means.

21. The Coriolis flow sensor of claim 20, wherein the resonance frequency and/or the damping ratio for the Coriolis tube are approximately 90% of the resonance frequency and the damping ratio of the compliant mounted detection means.

22. The Coriolis flow sensor of claim 18, wherein a resonance frequency and/or a damping ratio is/are higher for an internal mode of the Coriolis tube, compared to a resonance frequency and a damping ratio of the compliant mounted detection means.

23. A method for actively isolating vibrations in the Coriolis flow sensor of claim 1, wherein the method comprises a step of substantially fixing a position of the reference mass.

24. A method for actively isolating vibrations in the Coriolis flow sensor of claim 1, wherein the method comprises a step of substantially matching a dynamical behavior of the reference mass to a dynamical behavior of the Coriolis tube.

\* \* \* \* \*